United States Patent

Nakaoki et al.

[11] Patent Number: 5,978,320
[45] Date of Patent: Nov. 2, 1999

[54] RECORDING/REPRODUCING APPARATUS FOR USE WITH A PHOTOMAGNETIC RECORDING MEDIUM

[75] Inventors: Ariyoshi Nakaoki, Tokyo; Katsuhisa Aratani, Chiba; Akira Kouchiyama, Kanagawa, all of Japan

[73] Assignee: Sony Corporation, Tokyo, Japan

[21] Appl. No.: 09/076,648

[22] Filed: May 12, 1998

[30] Foreign Application Priority Data

May 16, 1997 [JP] Japan ..................................... 9-127501
May 19, 1997 [JP] Japan ..................................... 9-129027

[51] Int. Cl.$^6$ ................................................... G11B 11/00
[52] U.S. Cl. ............................................. 369/13; 369/283
[58] Field of Search ............................. 369/13, 288, 283, 369/284, 275.1, 275.2, 286; 360/59, 114

[56] References Cited

U.S. PATENT DOCUMENTS 5,197,049   3/1993   Wehrenberg ............................. 369/13

Primary Examiner—Ali Neyzari
Attorney, Agent, or Firm—Frommer Lawrence & Haug, LLP.; William S. Frommer; Dennis M. Smid

[57] ABSTRACT

A recording/reproducing apparatus for use with a photomagnetic recording medium. The apparatus comprises a magnetic coil and an optical system having a numerical aperture (NA) greater than 0.8 and arranged such that an optical axis thereof traverses the center of the magnetic coil. The photomagnetic recording medium has a magneto-optic recording film and a transparent protective layer having a thickness HCO formed sequentially on a substrate. The magnetic coil and the optical system are arranged on the transparent protective layer side of the photomagnetic recording medium when the photomagnetic recording medium is used with the apparatus and such that a combined distance equal to the thickness HCO and a distance d between a surface of the magnetic coil and an adjacent surface of the photomagnetic recording medium has a value of $0\ \mu m \leq d \leq 145\ \mu m$. The thickness HCO of the transparent protective layer may have a values of $0\ \mu m \leq HCO \leq 100\ \mu m$, and the distance d may have a value not larger than 45 $\mu m$. Additionally, an innermost radius Ri of the magnetic coil may have a value of 290 $\mu m$ or less.

5 Claims, 7 Drawing Sheets

RECORDING/REPRODUCING APPARATUS FOR USE WITH A PHOTOMAGNETIC RECORDING MEDIUM

BACKGROUND OF THE INVENTION

The present invention relates to a recording and reproducing apparatus and a magneto-optical recording medium for use therewith in which the magneto-optical recording medium includes a substrate layer, a reflective film layer, a magneto-optic recording film layer and a transparent protective layer. The present recording and reproducing apparatus may include a magnetic coil arranged on a surface which faces the magneto-optic recording film and an optical system arranged such that its optical axis traverses the center of the magnetic coil. Such magnetic coil and optical system may be arranged on the transparent protective layer side of the magneto-optical recording medium when the recording medium is being used with the recording and/or reproducing apparatus. As a result, the present recording and/or reproducing apparatus enables acceptable recording and reproducing signals to be provided.

A magneto-optic disc may include a transparent substrate having a thickness between 0.6 to 1.2 mm. Such magneto-optic disc may further include a transparent dielectric film which may be formed from silicon nitride, aluminum nitride, silicon oxide and/or ZnS by a so-called sputtering or a vacuum depositing operation on a surface of the transparent substrate;

photomagnetic recording films including amorphous rare earth metal magnetic films such as TbFeCo, GdFeCo, DyFeCo or TbFeCoCr, or perpendicular recording films such as PtCo which may be recorded or formed by a sputtering or vacuum depositing operations; an Al-based metal reflective film mainly composed of Al, AlTi or AlCr which may be formed by a sputtering or vacuum depositing operation; and a transparent protective layer of a UV-curable resin which may be formed by a so-called spin coating operation.

To record information on the above-mentioned photomagnetic recording medium, light is radiated from an optical system through the transparent substrate having a thickness between 0.6 to 1.2 mm to the recording medium so as to produce a phase change thereof. At the same time, a magnetic field is applied by a magnetic head from the opposite side of the transparent substrate. Such magnetic field may be modulated with the information by use of a magnetic field modulation device. As a result, the information may be recorded on the recording medium. To reproduce the information from the photomagnetic recording medium, light is also radiated by the optical system through the transparent substrate. In this situation, the optical system is arranged on the transparent substrate side of the disk.

Recording density may be improved by reducing the optical spot diameter. Such reduction may be achieved by increasing the value of the numerical aperture (NA) of the optical system such as to a value greater than 0.8.

However, if the numerical aperture NA of the optical system is increased as described above, the thickness of the transparent substrate (through which the irradiated light beam passes) may need to be reduced. More specifically, if the numerical aperture NA is increased, then the allowance of the angle by which the disc surface is deviated from the perpendicular with respect to an optical axis of the optical system (tilt angle) is reduced under the effect of double refraction or aberration due to the thickness of the transparent substrate. Accordingly, to reduce the effect of the tilt angle, the thickness of the transparent substrate should be decreased.

However, if the thickness of the transparent substrate is reduced as described above, and if the magnetic field is applied by the magnetic head from the transparent protective layer side, sufficient magnetic field strength may not be achieved because of the increased distance to the photomagnetic or magneto-optic recording film.

In an attempt to overcome the above mentioned problem, a recording and reproducing apparatus may be utilized wherein the magnetic head is provided between the transparent substrate and the optical system, thereby decreasing the distance between the magnetic head and the photomagnetic or magneto-optic recording film. However, even with such apparatus, if the transparent substrate has a thickness of 100 $\mu$m and the separation gap between a surface of a magnetic coil of the magnetic head which faces the transparent substrate and the surface of the transparent substrate or the surface of the magneto-optic disc is set to 100 $\mu$m, it may not be possible to provide a magnetic field having sufficient strength (for example, approximately 1500 Oe) for recording and reproducing signals. Further, to increase the strength of the generated magnetic field by use of this recording/reproducing apparatus, it may be necessary to increase the power supplied thereto in order to increase the strength of the generated magnetic field. As a result, the power consumption by the recording and reproducing apparatus may be increased which may cause circuitry to be damaged due to excessive heating and the associated mechanical or electrical overloads.

OBJECTS AND SUMMARY OF THE INVENTION

It is an object of the present invention to provide a recording and reproducing apparatus and an optical disc for use therewith in which a relatively large amount of data may be recorded onto the optical disc and which avoids the above-described disadvantages.

According to an aspect of the present invention an optical disc for use with a recording and reproducing apparatus is provided which includes a reflective film, a photomagnetic or magneto-optic recording film and a transparent protective layer all of which may be sequentially formed on a substrate. Further, in such aspect of the present invention, the recording and reproducing apparatus may include a magnetic coil and an optical system, wherein the magnetic coil is on the same side of the optical disc as the optical system and faces the transparent protective layer, and wherein the optical system has a numerical aperture (NA) greater than 0.8 and is arranged such that its optical axis traverses the center of the magnetic coil.

Therefore, at least the magnetic coil and the optical system of the recording and reproducing apparatus are arranged on the transparent protective film side of the optical disk. The thickness ($H_{co}$) of the transparent protective layer may be between 0 $\mu$m<$H_{co}$<100 $\mu$m. This arrangement enables a magnetic field of sufficient strength to be applied to the optical disc or photomagnetic recording medium so as to permit satisfactory recording and reproducing of signals.

If the thickness $H_{co}$ of the transparent protective layer is set between 1 $\mu$m<$H_{co}$<60 $\mu$m, a magnetic field of a sufficient intensity can be applied to the optical disc or photomagnetic recording medium to permit satisfactory recording and reproducing of signals even if a distance d (FIG. 1) between a surface of the magnetic coil which faces the photomagnetic recording medium and a surface of the photomagnetic recording medium which faces the magnetic coil is approximately 10 $\mu$m.

In accordance with another aspect of the present invention, a recording and reproducing apparatus is provided for use with an optical disc or photomagnetic recording medium having a reflective film, a magneto-optic recording film and a transparent protective layer formed sequentially on a substrate. Such recording and reproducing apparatus includes a magnetic coil and an optical system having a numerical aperture (NA) greater than 0.8 and arranged such that its optical axis traverses the center of the magnetic coil. The recording and reproducing apparatus is arranged on the transparent protective film side of the photomagnetic recording medium such that a distance d between a surface of the magnetic coil which faces the photomagnetic recording medium and a surface of the photomagnetic recording medium which faces the magnetic coil is not larger than 45 μm. As a result, a magnetic field produced with a reasonable amount of power and having sufficient intensity can be applied to the photomagnetic recording medium to assure acceptable recording and reproducing of signals.

If the above distance d is set to 20 μm≦d≦45 μm, the magnetic coil may be sufficiently spaced from the optical disk or photomagnetic recording medium so as to avoid colliding with a surface of the photomagnetic recording medium.

In accordance with yet another aspect of the present invention, a recording and reproducing apparatus is provided for use with an optical disk or photomagnetic recording medium having a reflective film, a magneto-optic recording film and a transparent protective layer formed sequentially on a substrate. Such recording and reproducing apparatus includes a magnetic coil and an optical system having a numerical aperture (NA) greater than 0.8 and arranged such that its optical axis traverses the center of the magnetic coil. The recording and reproducing apparatus is arranged on the transparent protective film side of the photomagnetic recording medium and an innermost radius Ri of the magnetic coil has a value not larger than 290 μm. As a result, a magnetic field produced with a reasonable amount of power and having sufficient strength may be applied to the photomagnetic recording medium to assure acceptable recording and reproducing of signals.

With the present invention, acceptable recording and reproducing of signals can be provided by arranging the magnetic coil between the transparent protective layer of the photomagnetic recording medium and the optical system of the recording and reproducing apparatus. Additionally, since the magnetic coil may be formed or arranged together with the objective lens of the optical system, the distance between the photomagnetic recording medium and the optical system may be reduced to cope with the higher NA value.

Other objects, features and advantages according to the present invention will become apparent from the following detailed description of illustrated embodiments when read in connection with the accompanying drawings in which corresponding components are identified by the same reference numerals.

DETAILED DESCRIPTION OF THE PREFERRED EMBODIMENTS

Preferred embodiments of the present invention will now be explained with reference to the accompanying drawings.

Figure 1:
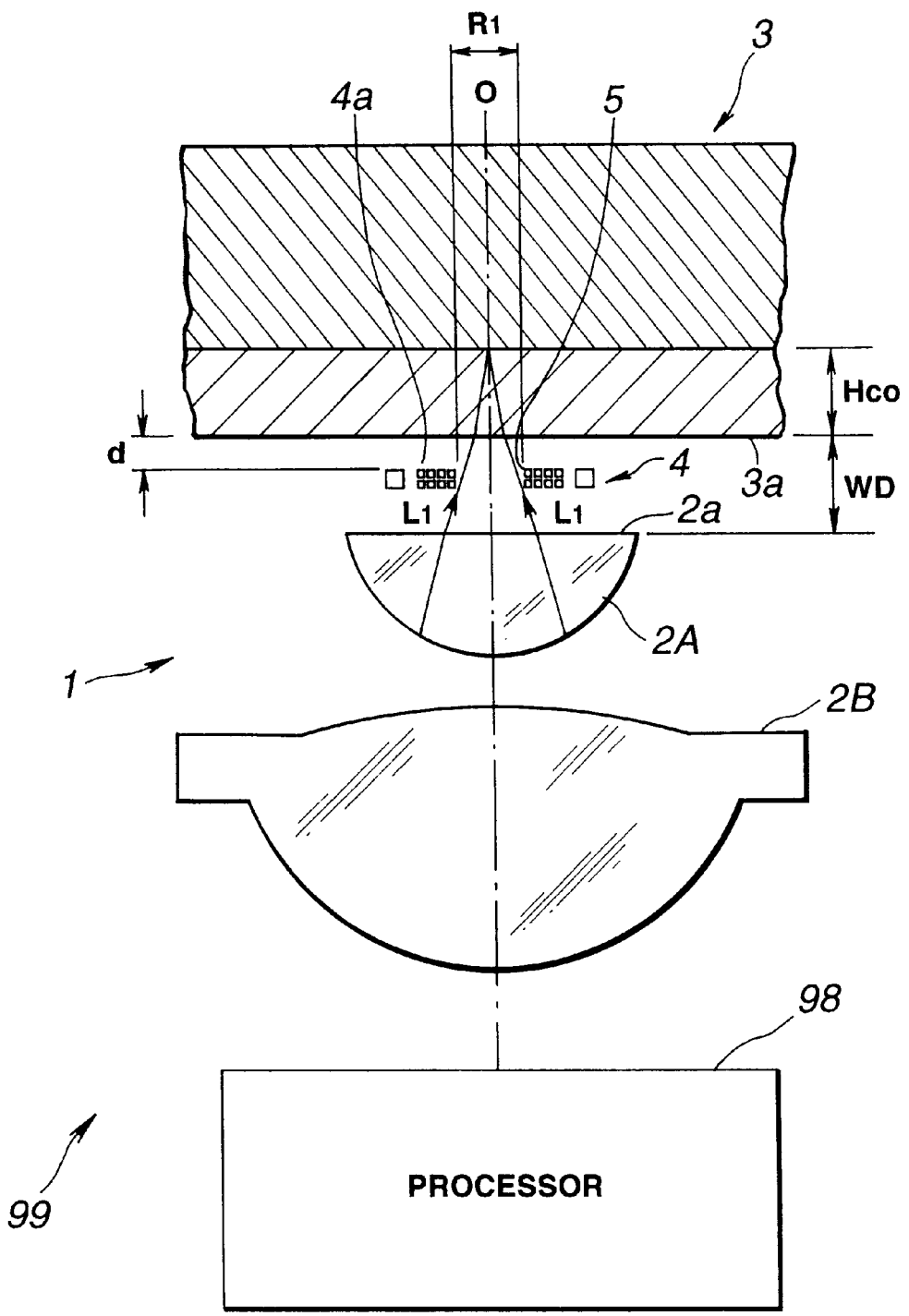
FIG. 1 is a diagram of a twin lens of an optical system and a magneto-optical disc according to an embodiment of the present invention.

FIG. 1 illustrates a recording and/or reproducing apparatus according to an embodiment of the present invention. As shown therein, such recording and/or reproducing apparatus 99 includes an optical or pick-up unit 1 and a processor 98. The recording and/or reproducing apparatus 99 is adapted to be used with an optical disc or photomagnetic recording medium 3.

The photomagnetic recording medium 3 may include a disc-shaped transparent substrate formed of glass or the like. Additionally, on a surface of the substrate, a reflective film formed of aluminum or the like, a recording surface film formed of silicon nitride or the like, a photomagnetic recording film formed of TbFeCo or the like, and a transparent dielectric film formed of silicon nitride or the like may be layered or formed in such order by use of a vacuum thin film forming or sputtering device. Formed on such layered product is a transparent protective film which may be formed from a UV ray curable resin having a refractive index of 1.533 or less and which may have a thickness up to 100 μm.

The recording and/or reproducing apparatus 99 includes a magnetic coil 4 arranged such that a surface 4a thereof faces the photomagnetic recording medium 3 and the optical system 1 having an objective lens 2A and a lens 2B with a numerical aperture (NA) of approximately 0.8 or more. The optical system 1, with the lenses 2A and 2B, is arranged so that its optical axis traverses the center of the magnetic coil 4. The magnetic coil 4 and the optical system 1 of the recording and/or reproducing apparatus 99 are arranged on the transparent protective film side of the photomagnetic recording medium 3.

The magnetic coil 4 is further arranged so as to face a surface 2a of the objective lens 2A of the optical system 1 such that the optical axis thereof traverses the center of the magnetic coil. As indicated by arrows L1, light condensed by the objective lens 2A traverses a magnetic field generating portion 5 of the magnetic coil 4 and converges at a point 0.

Figure 4:
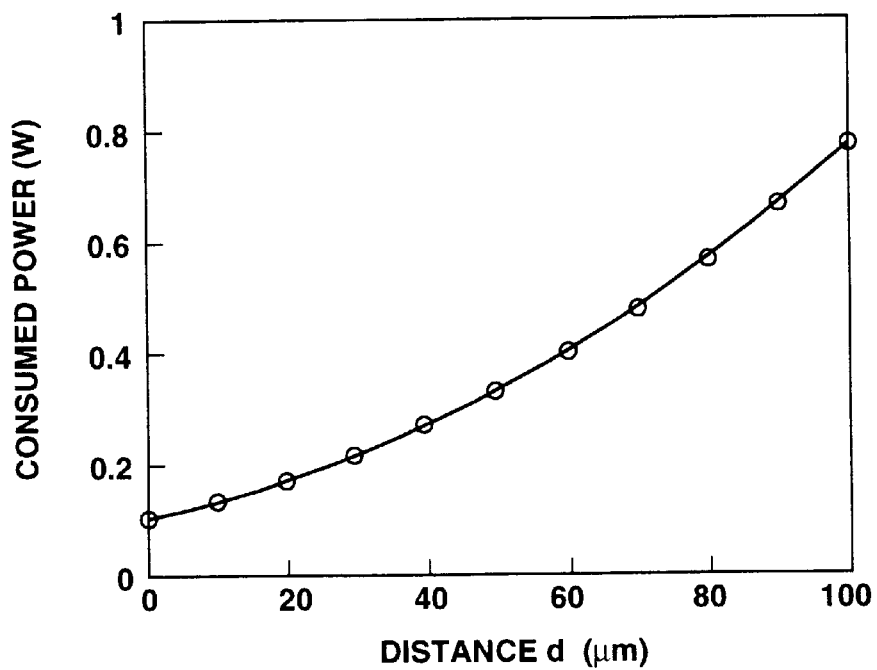
FIG. 4 is a graph showing the relation between the distance d and the power consumption.
Figure 5:
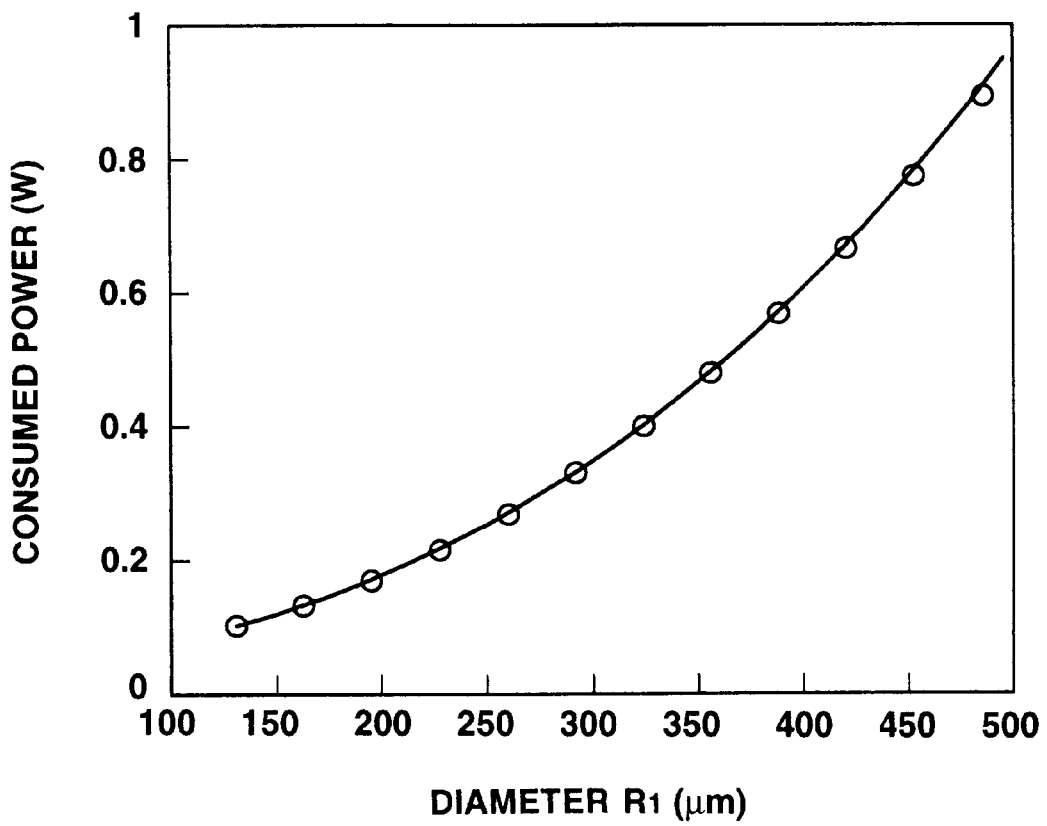
FIG. 5 is a graph showing the relation between an innermost radius Ri and the power consumption.

The recording and/or reproducing apparatus 99 is arranged such that a distance "d" between the surface 4a of the magnetic coil 4 and a surface 3a of the photomagnetic recording medium 3 has a value up to approximately 45 μm which corresponds to a power consumption of approximately 300 mW or less (FIG. 4). In addition, in the recording and/or reproducing apparatus 99, an innermost radius Ri of the magnetic coil 4 has a value up to approximately 290 μm, which also corresponds to a power consumption of approximately 300 mW or less (FIG. 5).

An experiment was conducted to determine a relationship between the thickness HCO of the transparent protective film, the distance d, and the strength of the magnetic field provided from the magnetic coil. Such experiment will now be described.

Initially, three samples of photomagnetic recording mediums were obtained.

Figure 9:
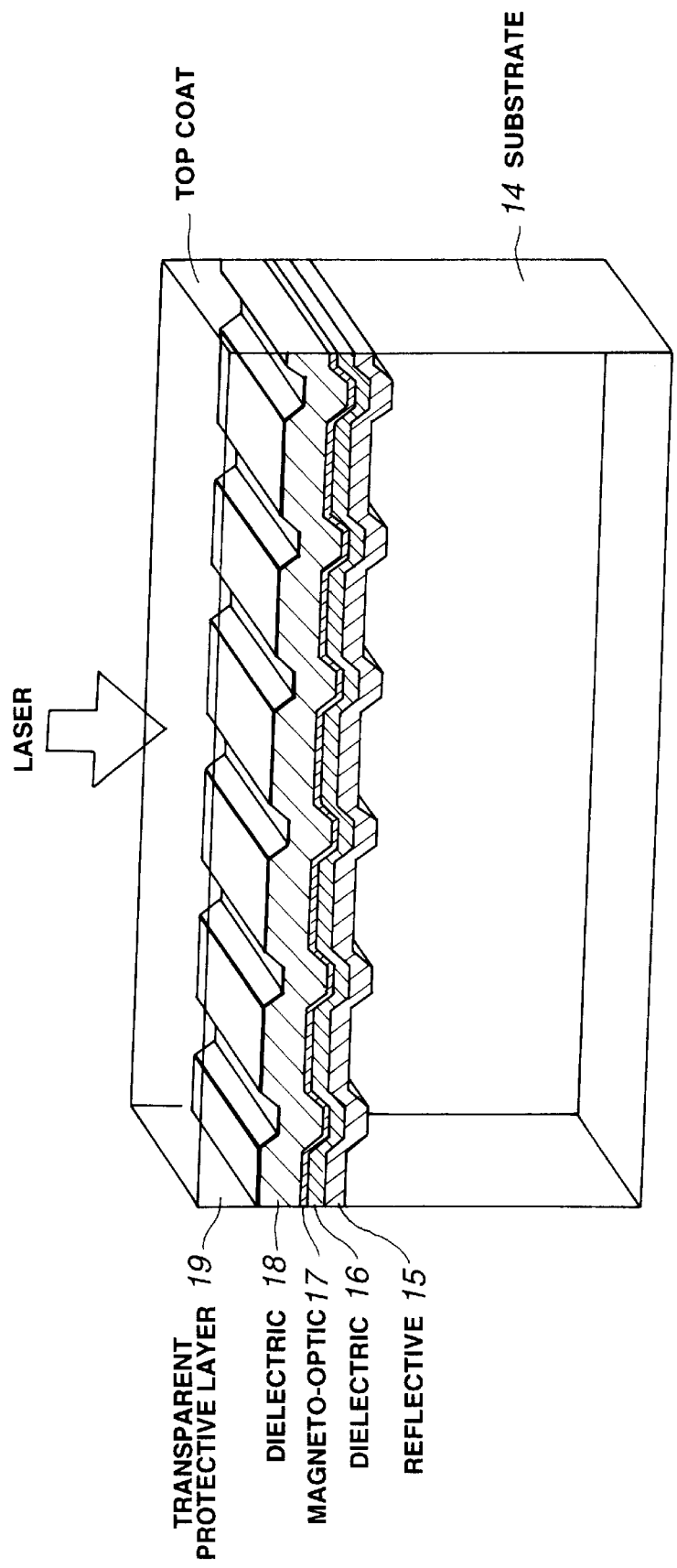
FIG. 9 is a diagram of an optical recording medium according to an embodiment of the present invention.

Sample 1, as shown in FIG. 9, includes a disc-shaped glass 2P substrate (14) (GL-2P substrate) having a thickness of 1.2 mm to which are layered an aluminum reflective film (15), a transparent dielectric film (16) formed of silicon nitride, a magneto-optic recording film (17) formed of TbFeCo, and a transparent dielectric film (18) formed of silicon nitride in this order and which are formed by sputtering. Additionally, a UV ray curable resin having a refractive index up to 1.533 was applied to a pre-set film thickness to form a transparent protective layer (19) with a thickness HCO of 100 μm.

Sample 2 was manufactured in a manner similar to that of sample 1 until the formation of the transparent dielectric film. Onto this layered product was coated a UV ray curable resin (as in sample 1) to form a transparent protective film having a thickness HCO of 80 μm.

Sample 3 was manufactured in a manner similar to that of sample 1 until the formation of the transparent dielectric film. Onto this layered product was coated a UV ray curable resin (as in sample 1) to form a transparent protective film with a thickness HCO of 60 μm.

Information was recorded onto samples 1–3 by the recording and/or reproducing apparatus 99. As previously described, such apparatus has the magnetic coil 4 arranged on the transparent protective film side of the photomagnetic recording medium 3 and has the optical system 1 with a numerical aperture (NA) greater than 0.8 which is arranged such that its optical axis traverses the center of the magnetic coil.

During the recording of information in samples 1–3, the strength of the generated magnetic field was determined as the distance d (that is, the distance between the surface 4a of the magnetic coil 4 and the surface 3a of the photomagnetic recording medium 3) was varied. During this time, a current of approximately 200 mA was applied to the magnetic coil 4.

Figure 2:
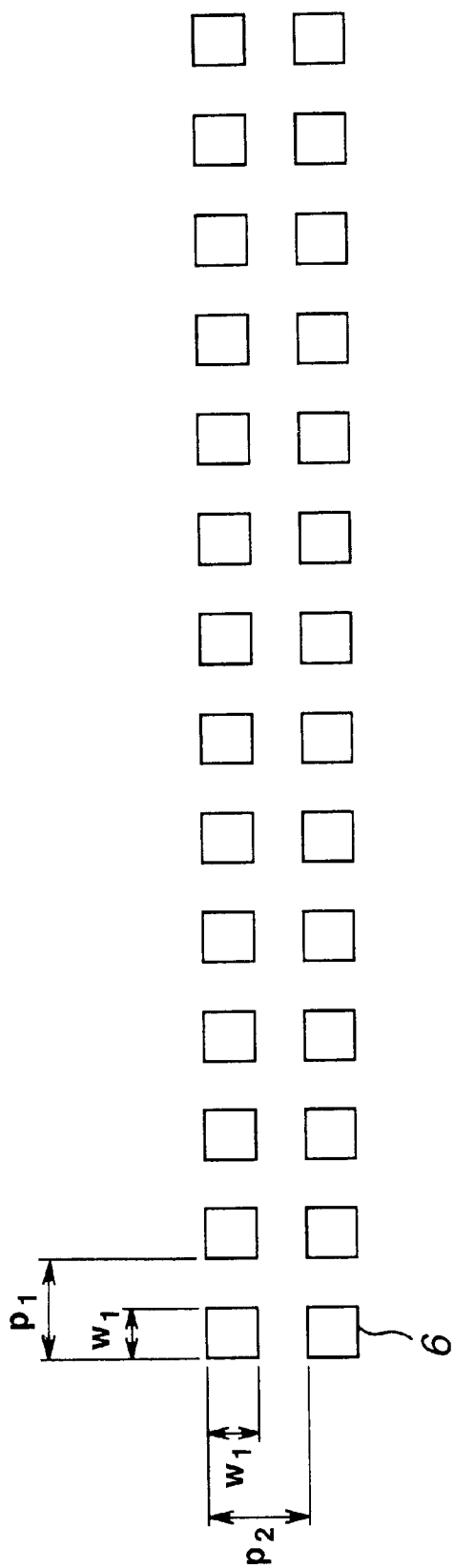
FIG. 2 is a diagram of a pattern for forming a thin-film coil.

The magnetic coil 4 of the present recording and reproducing apparatus 99 may be formed as a thin film coil by an etching operation so as to have a forming pattern as shown in FIG. 2. Such pattern includes a plurality of patterns or elements 6 each having a square planar shape in which each side w1 thereof has a length of approximately 15 μm. Further, such patterns are arranged in two rows or columns with a pitch p1 of approximately 30 μm in the horizontal direction and with a pitch p2 of approximately 20 μm in the vertical direction.

In the present recording and/or reproducing apparatus, since the magnetic field generating portion 5 of the magnetic coil 4 is traversed by the light collected by the objective lens 2A, as described above, the innermost radius Ri should be large enough not to obstruct the light path.

As an example, when the numerical aperture NA is 0.8, the thickness HCO of the transparent protective film is 100 μm, and the distance d is 100 μm, the light spot diameter on the photomagnetic recording medium 3 may be approximately 389 μm. As another example, when the numerical aperture NA is 0.8, the thickness HCO of the transparent protective film is 50 μm, and the distance d is 50 μm, the light spot diameter on the photomagnetic recording medium 3 may be approximately 194 μm. Such change in diameter may result since the light focussed on the photomagnetic recording film is spread over a relatively large angle of 31° or less or 53° or less due to the UV ray curable resin of the transparent protective layer and the atmospheric air between the photomagnetic recording medium 3 and the objective lens.

Therefore, if the distance between the magnetic coil 4 and the magneto-optic recording film is varied, that is, if the distance d is changed, the inner radius R1 of the magnetic field generating portion 5 of the magnetic coil 4 should to be changed.

Thus, in the present experimental example, when the distance d is varied, the innermost radius R1 of the magnetic coil 4 should be sized so as not to obstruct the optical path.

Figure 3:
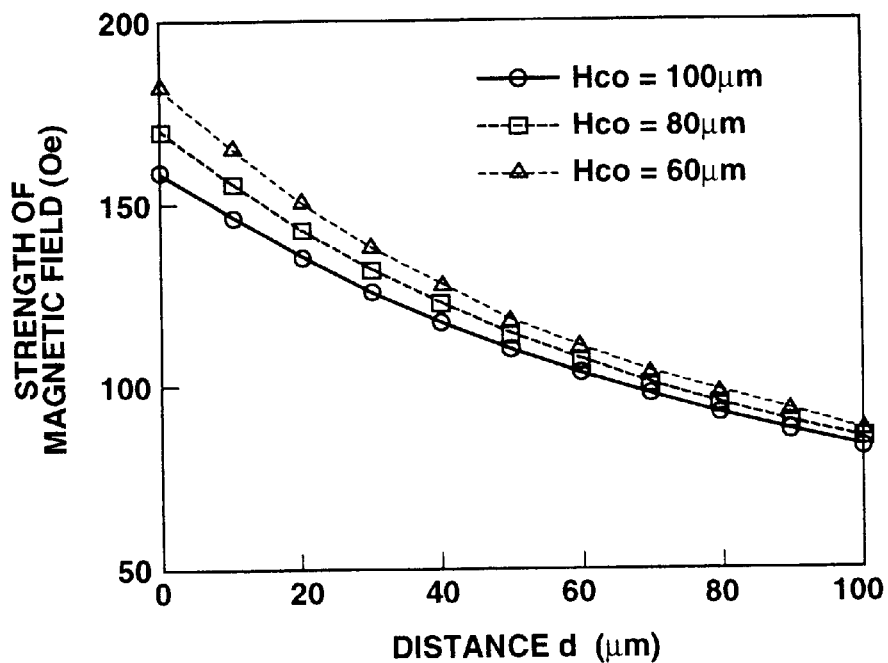
FIG. 3 is a graph showing the relation between the thickness $H_{co}$ of a transparent protective layer, distance d and the strength of the magnetic field.

The results of the present experiment are shown in FIG. 3, in which the abscissa denotes the distance d and the ordinate denotes the strength of the magnetic field generated or emanated from the magnetic coil 4. In FIG. 3, o, □ and Δ denote results of the samples 1, 2, and 3 which have thicknesses HCO of the transparent protective film of 100 μm, 80 μm and 60 μm, respectively.

Based upon the results of FIG. 3, if the thickness HCO of the transparent protective layer is 100 μm or less, then the strength of the magnetic field can be secured to a certain extent even if the distance d increases somewhat.

As a result, the present invention provides a recording and/or reproducing apparatus for use with a photomagnetic recording medium having a substrate and a reflective film, a magneto-optic recording film and a transparent protective layer sequentially formed thereon. Further, the recording and/or reproducing apparatus includes a magnetic coil and an optical system, wherein the magnetic coil and the optical system are arranged on the transparent protective layer side of the photomagnetic recording medium and wherein the optical system is arranged such that its optical axis traverses the center of the magnetic coil. The numerical aperture NA of the optical system of the recording and/or reproducing apparatus is greater than 0.8 and the thickness HCO of the transparent protective layer of the photomagnetic recording film may have a value in the range $0 \mu m \leq HCO \leq 100 \mu m$. As a result, a magnetic field having sufficient strength can be applied to the photomagnetic recording medium so as to produce acceptable recording and reproducing signals.

Further, as shown in FIG. 3, if the thickness HCO of the transparent protective layer is approximately 60 μm or less, a magnetic field having a strength greater than 150 Oe can be produced even if the distance d is approximately 20 μm. Such arrangement will provide satisfactory recording and reproducing signals. Additionally, it should be noted that a predetermined distance (such as at least 20 μm) between the magnetic coil and the photomagnetic recording medium should be provided so as to account for tolerances or errors in the coil thickness, a protrusion on the photomagnetic recording medium and so forth and as such avoid a collision between the magnetic coil and the photomagnetic recording medium.

Thus, if the thickness HCO of the transparent protective layer of the photomagnetic recording medium 3 has a value in the range $1 \mu m \leq HCO \leq 60 \mu m$, a magnetic field having sufficient strength can be applied across the photomagnetic recording medium to assure sufficient recording and reproducing characteristics even if the distance d is approximately 20 μm.

Another experiment was conducted to determine the relation between the distance d and the power consumption. Such experiment will now be described.

When the distance between the magnetic coil and the photomagnetic recording medium is increased, it may be tempting to simply increase the current supplied to the magnetic coil so as to increase the strength of the magnetic field to the desired level. However, this approach may not always be desirable because in doing so the inner diameter of the magnetic coil may be increased which may increase the entire length of the magnetic coil and thereby adversely affect the magnetic reluctance.

Thus, the power consumption which enables the magnetic coil to produce a magnetic field having a strength of 150 Oe as a function of the distance d will be determined. Such results thereof are shown in FIG. 4, in which the abscissa and the ordinate denote the above distance d and the power consumption in the magnetic coil, respectively.

A practical value for power consumption is approximately 300 mW or less. As shown in FIG. 4, to limit power consumption to approximately 300 mW or less, the distance d should be approximately 45 $\mu$m or less.

As a result, the present invention provides a recording and/or reproducing apparatus for use with a photomagnetic recording medium having a substrate and a reflective film, a magneto-optic recording film and a transparent protective layer formed sequentially thereon. Further, the recording and/or reproducing apparatus includes a magnetic coil and an optical system, wherein the magnetic coil and the optical system are arranged on the transparent protective layer side of the photomagnetic recording medium and wherein the optical system is arranged such that its optical axis traverses the center of the magnetic coil. The numerical aperture NA of the optical system of the recording and/or reproducing apparatus is greater than 0.8 and the distance d has a value of 45 $\mu$m (or less). As a result, a magnetic field having sufficient strength can be applied across the photomagnetic recording medium by using the practical value of power consumption so as to provide acceptable recording and reproducing characteristics.

Further, if the focus angle of the optical path is considered when power consumption is determined, then the distance d may be more controlling than the thickness HCO of the transparent protective layer.

Another experiment was conducted to determine the relation between the innermost radius Ri of the magnetic coil and the power consumption for enabling the magnetic coil to provide a constant magnetic field strength. In particular, the power consumption (resistance X current squared) was determined which enables the magnetic coil to provide a magnetic field strength of 150 Oe as a function of the innermost radius. Such experiment will now be described.

The results of the present experiment are shown in FIG 5, in which the abscissa and the ordinate denote the innermost radius Ri and the power consumption in the magnetic coil, respectively. As previously mentioned, a practically value for the power consumption is approximately 300 mW or less. Accordingly, if the power consumption is to be lower than approximately 300 mW, the innermost radius Ri of the magnetic coil has a value of 290 $\mu$m or less as indicated in FIG. 5.

Another embodiment of the present recording and/or reproducing apparatus will now be described.

Figure 6:
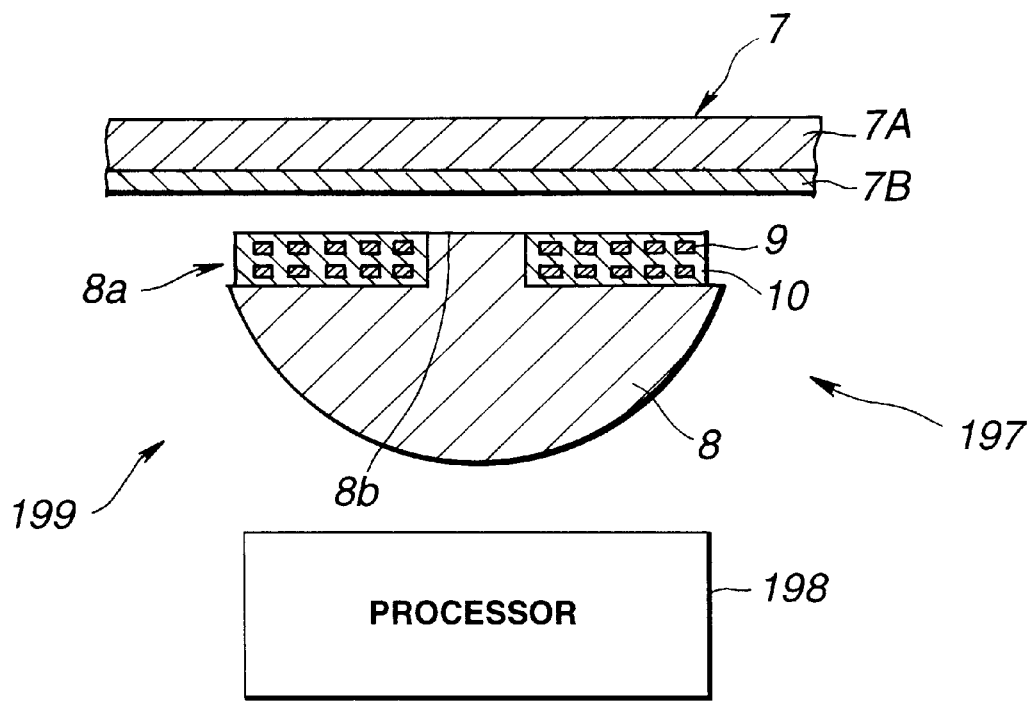
FIG. 6 is a diagram of a thin-film coil arranged in an optical system according to another embodiment of the present invention.

As shown in FIG. 6, a recording and/or reproducing apparatus 199 includes a processor 198 and a unit 197 having an objective lens 8 and a thin-film coil 9. The recording and/or reproducing apparatus 99 is adapted to be used with an optical disc or recording medium 7.

A laser light beam may be incident on the optical disc 7 (which may be a magneto-optical type disc) from the objective lens 8.

The thin-film coil 9 is arranged on a surface 8a of the objective lens 8 which faces the magneto-optical disc 7. The thin-film coil or magnetic field generating unit 9 generates a magnetic field corresponding to the recording signals supplied from a pre-set device such as processor 198. Such generated magnetic field may be applied at a laser light beam illuminating position.

The thin-film coil 9 may be machined or formed to a desired shape (such as a circular or spiral shape) by a photolithographic technique. As an example, the thin-film coil 9 may be obtained by forming an electrically conductive material to a film and etching the resulting film to a desired shape by the photolithographic technique. The electrically conductive material may be selected from Cu, Ag and Au or an alloy containing at least one of these metals.

Figure 7:
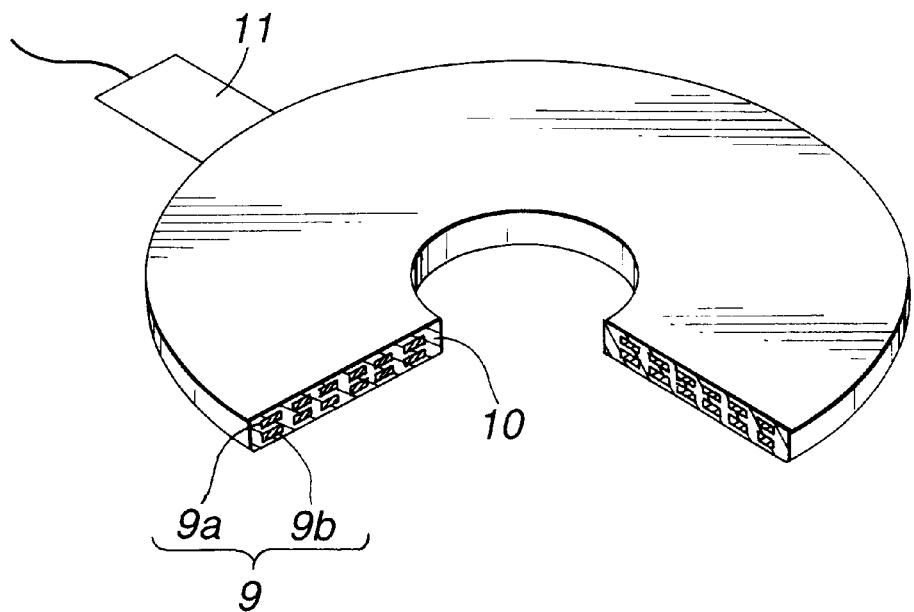
FIG. 7 is a diagram of the thin-film coil of FIG. 6.

Additionally, the thin-film coil 9 may have a dual-layer structure which includes a first-layer coil 9a and a second-layer coil 9b, as shown in FIGS. 6 and 7. The coils 9a and 9b may be embedded in an insulating material 10. A lead-out electrode 11 for providing electrical connection between the thin-film coil 9 and an external circuit or device is also provided.

The thin-film coil 9 is embedded in the insulating material 10 to provide protection and/or to provide insulation between layers in the case of a multi-layer structure. The insulating material 10 may be a resist, polyamide or an acrylic resin type material.

The thickness of the thin-film coil 9, inclusive of the insulating material 10, may be 7 to 100 $\mu$m.

As a result, an optical system having the objective lens 8 may be arranged closer to the magneto-optical disc 7. Such arrangement may enable the recording and/or reproducing apparatus 199 to cope with or compensate for higher NA values of the optical system. By having the objective lens 8 closer to the magneto-optical disc 7, the angle of the laser light beam may be reduced, thereby permitting a smaller opening in the coil.

Therefore, the present arrangement may enable an optical system to be utilized which has a relatively high NA value.

The diameter of a central through-hole formed in the insulating material 10 may have a value from 20 $\mu$m to 500 $\mu$m, wherein the innermost radius of the thin-film coil 9 has a value equal to the diameter of the central through-hole in the insulating material 10 plus 100 $\mu$m. Light from the optical system may traverse or pass through this size through-hole.

The thin-film coil 9 is arranged substantially parallel to a recording layer 7b of the magneto-optical disc 7 and the direction of the recording current is substantially parallel to the recording layer 7b. As a result, a magnetic field substantially perpendicular to the film surface of the recording layer 7b through the central through-hole may be generated and applied to the recording layer 7B.

Figure 8:
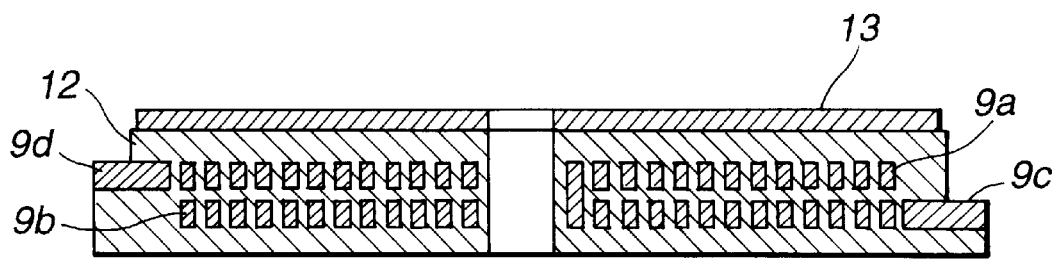
FIG. 8 is a diagram of a magnetic core arranged on the thin-film coil of FIG. 6.

To increase the magnetic field efficiency, a magnetic core 13 may be layered or arranged on the thin-film coil 9 by way of an insulating layer 12, as shown in FIG. 8. The magnetic core 13 may be formed from a wide variety of materials may be used such as Ni-Fe alloys, Co-based amorphous alloys, Fe-Al-Si alloys, Fe-C alloys and Ni-Fe alloys, layered together, Fe-Ta-N alloys, Mn-Zn ferrite or Ni-Zn ferrite. Such materials may be used alone or in combinations.

In the present embodiment, the first-layer coil 9a, second-layer coil 9b and electrode lead-out portions 9c, 9d may be formed by patterning and by the photolithographic technique. The insulating layer 12 may be formed using a photoresist, and the magnetic core 13 may be formed by patterning a CoPdZr amorphous film having a thickness of 2 μm. The optical system and, in particular, the objective lens 8, may be formed from a material having substantially the same refractive index as the disc substrate 7A of the magneto-optical disc 7. The objective lens 8 is formed such that one surface is a spherical-type surface and a surface opposite the magneto-optical disc 7 is a circular planar-type surface. As a result, a light beam incident on the spherical surface may be converged and radiated from the planar surface portion so as to be illuminated at a pre-set position on the recording layer 7B of the magneto-optical disc 7.

The thin-film coil 9 may be formed by patterning the circular planar surface 8a of the objective lens 8. A circular boss 8b which corresponds in shape to the inner rim portion (central through-hole) of the thin-film coil 9 is provided at a mid-portion of the circular planar surface 8a of the objective lens 8. Such circular boss 8b may aid in providing a desired path of the optical axis of the optical system and preventing the thin-film coil 9 from contacting the magneto-optical disc 7, thereby protecting the thin-film coil 9.

Although preferred embodiments of the present invention and modifications thereof have been described in detail herein, it is to be understood that this invention is not limited to these embodiments and modifications, and that other modifications and variations may be effected by one skilled in the art without departing from the spirit and scope of the invention as defined by the appended claims.

What is claimed is:

1. A recording/reproducing apparatus for use with a photomagnetic recording medium, said apparatus comprising:

a magnetic coil; and an optical system having a numerical aperture (NA) greater than 0.8 and arranged as such that an optical axis thereof traverses the center of the magnetic coil;

in which said photomagnetic recording medium has a magnetic-optic recording film and a transparent protective layer having a thickness HCO formed sequentially on a substrate, in which a distance d between a surface of said magnetic coil and an adjacent surface of said photomagnetic recording medium has a value of 20 $\mu$m$\leq$d$\leq$45 $\mu$m, and in which said magnetic coil and said optical system are arranged on the transparent protective layer side of said photomagnetic recording medium when said photomagnetic recording medium is used with said apparatus and such that a combined distance $d_{com}$ equal to said thickness HCO and said distance d has a value of 0 $\mu$m$\leq d_{com}\leq$145 $\mu$m.

2. The recording/reproducing apparatus according to claim 1, wherein said thickness HCO of said transparent protective layer has a value of 0 $\mu$m$\leq$HCO$\leq$100 $\mu$m.

3. The recording/reproducing apparatus according to claim 1, wherein said thickness HCO of said transparent protective layer has a value of 1 $\mu$m$\leq$HCO$\leq$60 $\mu$m.

4. A recording/reproducing apparatus for use with a photomagnetic recording medium, said apparatus comprising:

a magnetic coil having an inner radius of 290 $\mu$m or less; and an optical system having a numerical aperture (NA) greater than 0.8 and arranged such that an optical axis thereof traverses the center of the magnetic coil;

in which said photomagnetic recording medium has a magneto-optic recording film and a transparent protective layer formed sequentially on a substrate, in which a distance d between a surface of said magnetic coil and an adjacent surface of said photomagnetic recording medium has a value of 20 $\mu$m$\leq$d$\leq$45 $\mu$m, and in which said magnetic coil and said optical system are arranged on the transparent protective layer side of said photomagnetic recording medium when said photomagnetic recording medium is used with said apparatus.

5. A recording/reproducing apparatus for use with a photomagnetic recording medium, said apparatus comprising:

a magnetic coil; and an optical system having a numerical aperture (NA) greater than 0.8 and arranged as such that an optical axis thereof traverses the center of the magnetic coil;

in which said photomagnetic recording medium has a magnetic-optic recording film and a transparent protective layer having a thickness HCO formed sequentially on a substrate, in which a distance d between a surface of said magnetic coil and an adjacent surface of said photomagnetic recording medium has a value of d$\leq$45 $\mu$m, and in which said magnetic coil and said optical system are arranged on the transparent protective layer side of said photomagnetic recording medium when said photomagnetic recording medium is used with said apparatus and such that a combined distance $d_{com}$ equal to said thickness HCO and said distance d has a value of 0 $\mu$m$\leq d_{com}\leq$145 $\mu$m.

* * * * *